(12) United States Patent
Incertis Carro

(10) Patent No.: US 7,747,949 B2
(45) Date of Patent: Jun. 29, 2010

(54) SYSTEM AND METHOD COMPRISING AN ELECTRONIC DOCUMENT FROM PHYSICAL DOCUMENTS

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 1224 days.

(21) Appl. No.: 10/562,093

(22) PCT Filed: May 13, 2004

(86) PCT No.: PCT/EP2004/006904

§ 371 (c)(1),
(2), (4) Date: Dec. 21, 2005

(87) PCT Pub. No.: WO2005/001710

PCT Pub. Date: Jan. 6, 2005

(65) Prior Publication Data

US 2009/0013247 A1 Jan. 8, 2009

(30) Foreign Application Priority Data

Jun. 26, 2003 (EP) .................................. 03368057

(51) Int. Cl.
*G06F 17/00* (2006.01)
*G06G 5/00* (2006.01)

(52) U.S. Cl. .................... 715/255; 715/232; 715/234; 715/768; 715/770; 345/173

(58) Field of Classification Search ................. 715/200, 715/201, 202, 203, 205, 206, 226, 229, 230, 715/231, 232, 233, 234, 243, 244, 245, 246, 715/253, 255, 256, 263, 273, 274, 701, 760, 715/764, 768, 770, 790, 864; 345/173, 176, 345/179, 183, 676

See application file for complete search history.

(56) References Cited

U.S. PATENT DOCUMENTS 5,402,151 A * 3/1995 Duwaer ...................... 345/173

(Continued)

FOREIGN PATENT DOCUMENTS

EP 0 622 722 11/1994

(Continued)

OTHER PUBLICATIONS

Grasso et al., "Augmenting Paper to Enhance Community Information Sharing," ACM, 2000, pp. 51-62.*

(Continued)

*Primary Examiner*—Laurie Ries
*Assistant Examiner*—Maikhanh Nguyen
(74) *Attorney, Agent, or Firm*—Schmeiser, Olsen & Watts; William H. Steinberg

(57) ABSTRACT

A method for processing a physical document. A record is created in a selections table stored in a user device. Creating the record includes entering into the record: a document number that identifies both the physical document and an electronic document that is an electronic copy of the physical document, a page number that identifies a page of the physical document and a corresponding page of the electronic document, and a network address of a server that stores the electronic document. The user device receives an identification of where a selected region within the page of the physical document is located within the page. The received identification is inserted into the record of the selections table. Selected data in the record of the selections table may be sent to a user workstation, such that the selected data includes the document number, the page number, and the network address.

11 Claims, 14 Drawing Sheets

Method for selecting parts of physical documents and recording said selections in the Selections Table

U.S. PATENT DOCUMENTS

| | | | |
|---|---|---|---|
| 5,737,740 A | 4/1998 | Henderson et al. | |
| 6,115,008 A * | 9/2000 | Palalau et al. | 345/7 |
| 6,330,976 B1 * | 12/2001 | Dymetman et al. | 235/487 |
| 6,537,324 B1 * | 3/2003 | Tabata et al. | 715/205 |
| 7,027,038 B2 * | 4/2006 | Carro | 345/173 |
| 7,472,338 B2 * | 12/2008 | Carro | 715/205 |
| 2001/0053252 A1 | 12/2001 | Creque | |
| 2001/0056439 A1 * | 12/2001 | Carro | 707/500.1 |
| 2002/0047870 A1 * | 4/2002 | Carro | 345/855 |

FOREIGN PATENT DOCUMENTS

| | | |
|---|---|---|
| WO | WO 01/83213 | 11/2001 |
| WO | WO 02/052488 | 7/2002 |
| WO | WO 03/042862 | 5/2003 |

OTHER PUBLICATIONS

Heiner et al, "Linking and Messaging from Real Paper in the Paper PDA," ACM, 1999, pp. 179-186.*

Arai et al, "PaperLink: A Technique for Hyperking from Real Paper to Electronic Content," ACM, 1997, pp. 327-334.*

Siio et al, "Real-word Interaction Using the FieldMouse," ACM, 1999, pp. 113-119.*

* cited by examiner

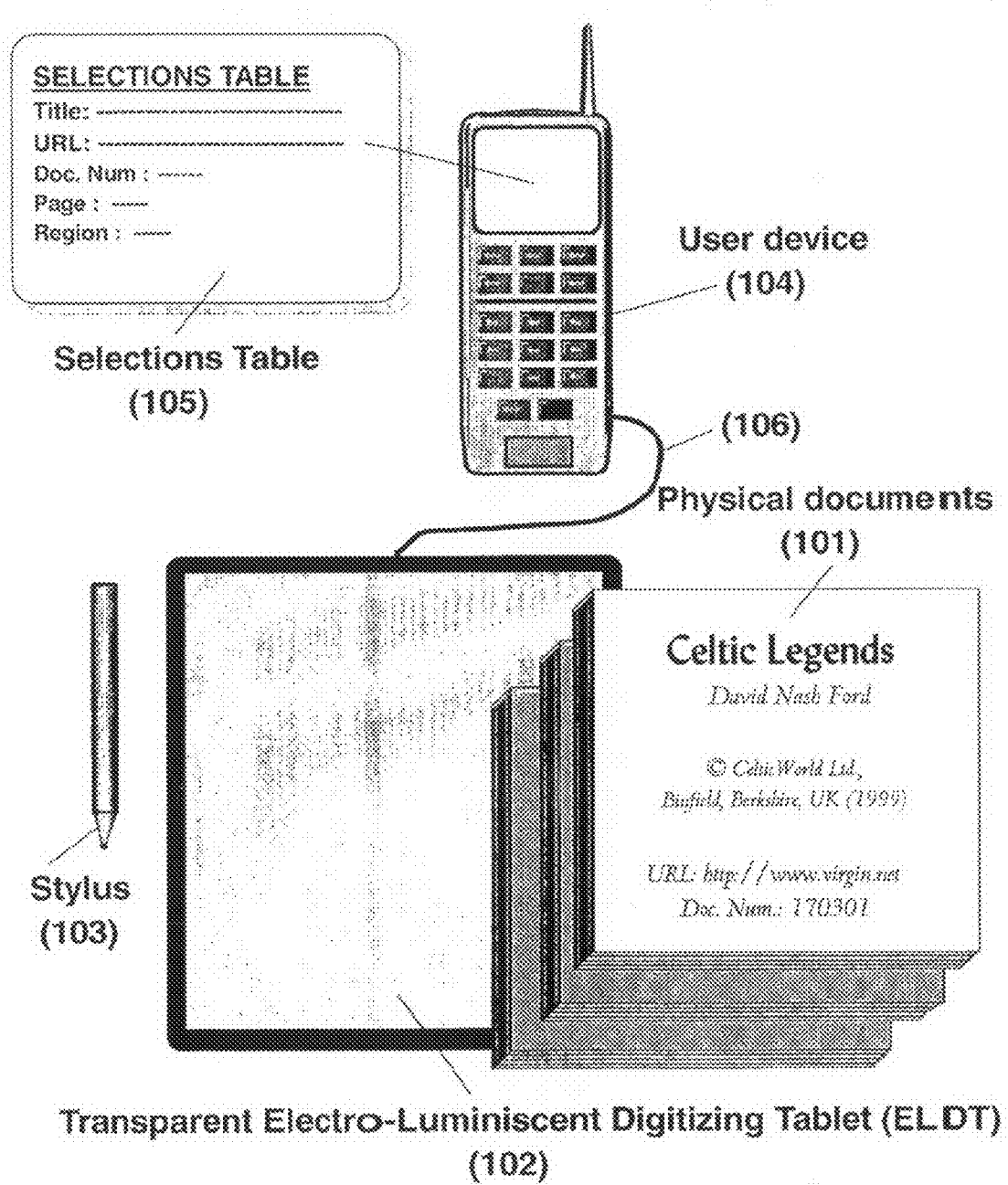
Fig. 1: Components used to select parts of physical documents

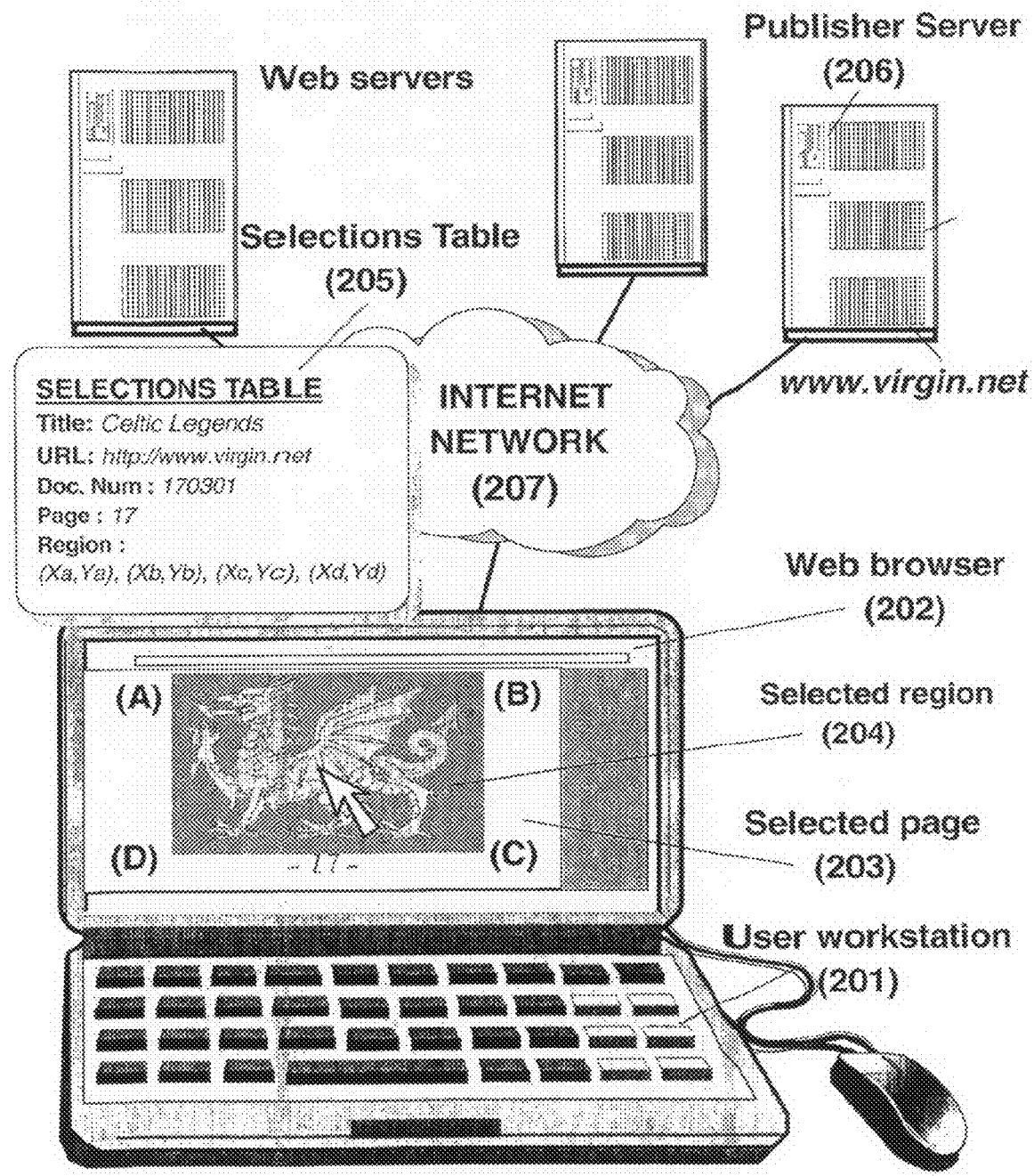
Fig. 2: The user, using a workstation connected to Internet, retrieves the digital content of the selections done in the physical document

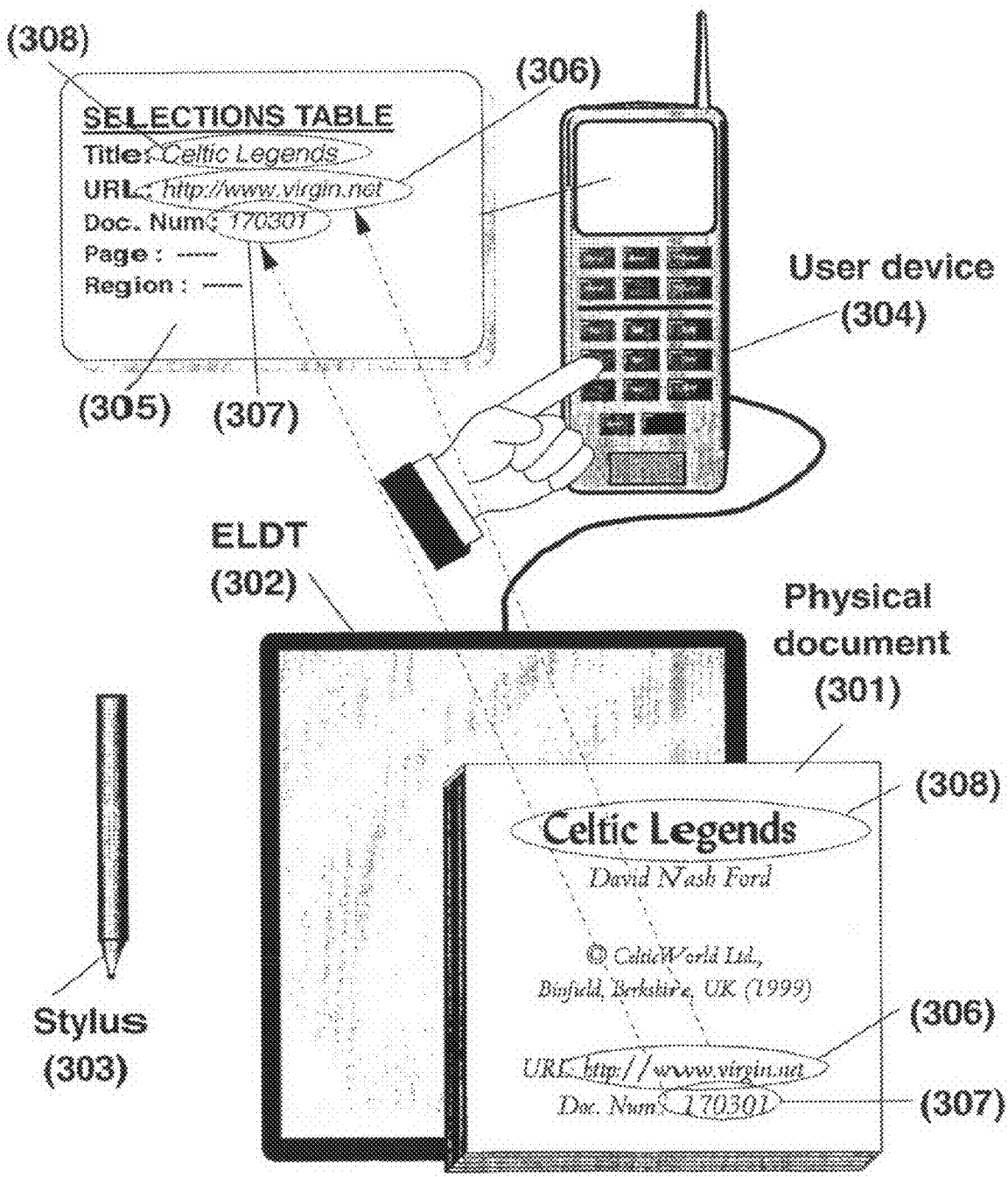
Fig. 3: The user identifies the physical document on the user device

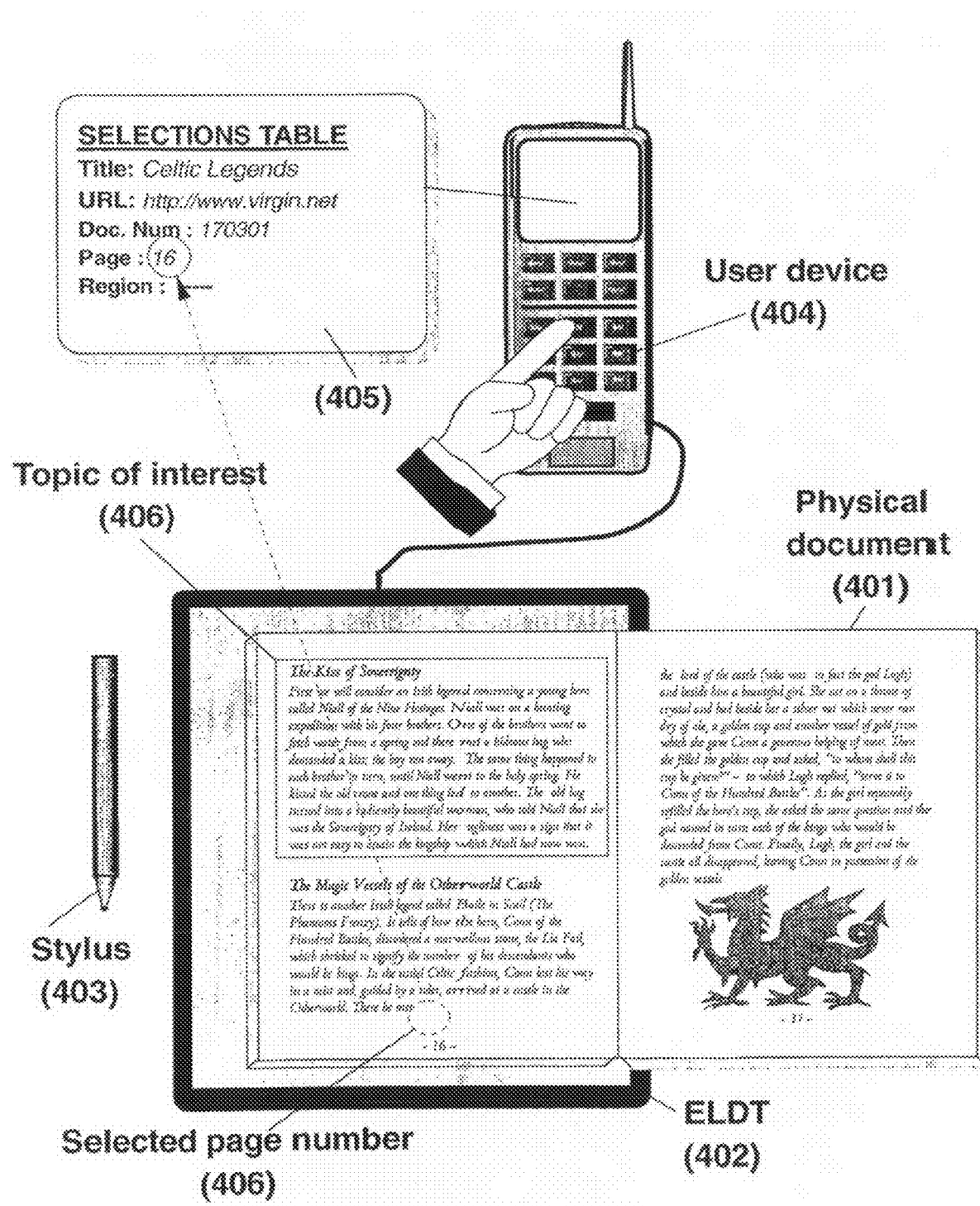
Fig. 4: The user identifies a page of the physical document to make a selection

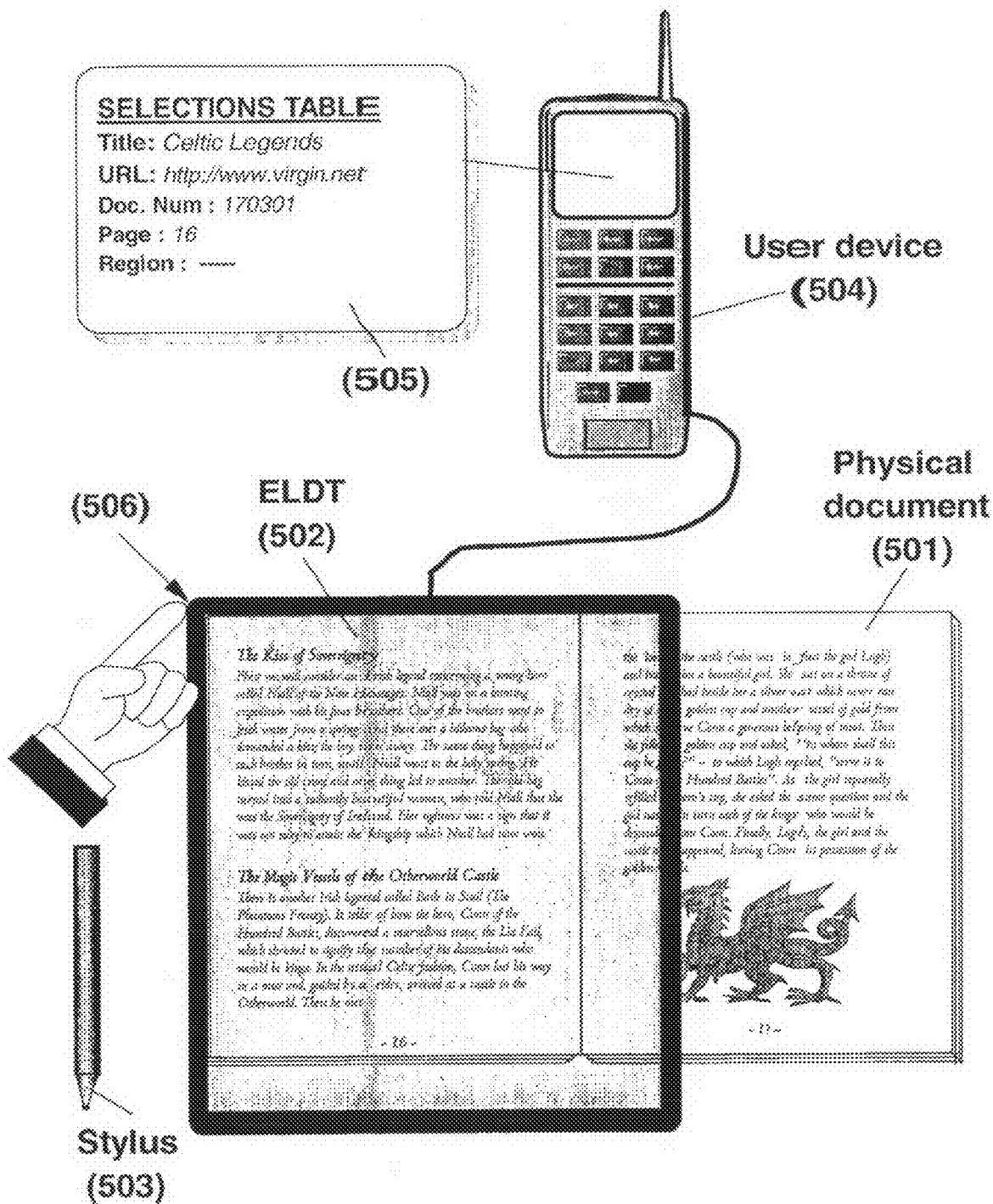
Fig. 5: The user aligns the transparent ELDT device over the page on which he desires to make a selection

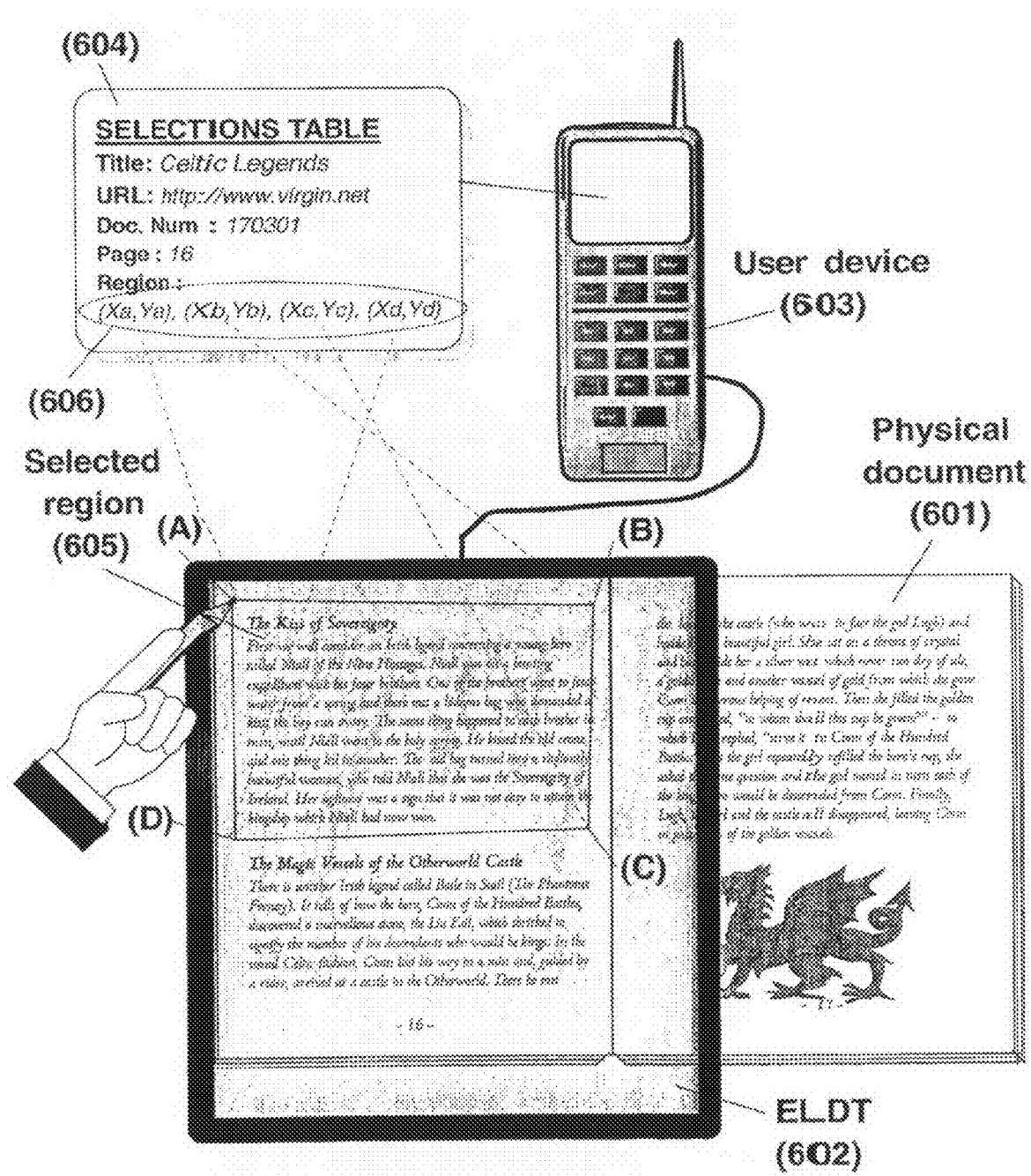
Fig. 6: The user marks with the stylus the selected region on the transparent ELDT device

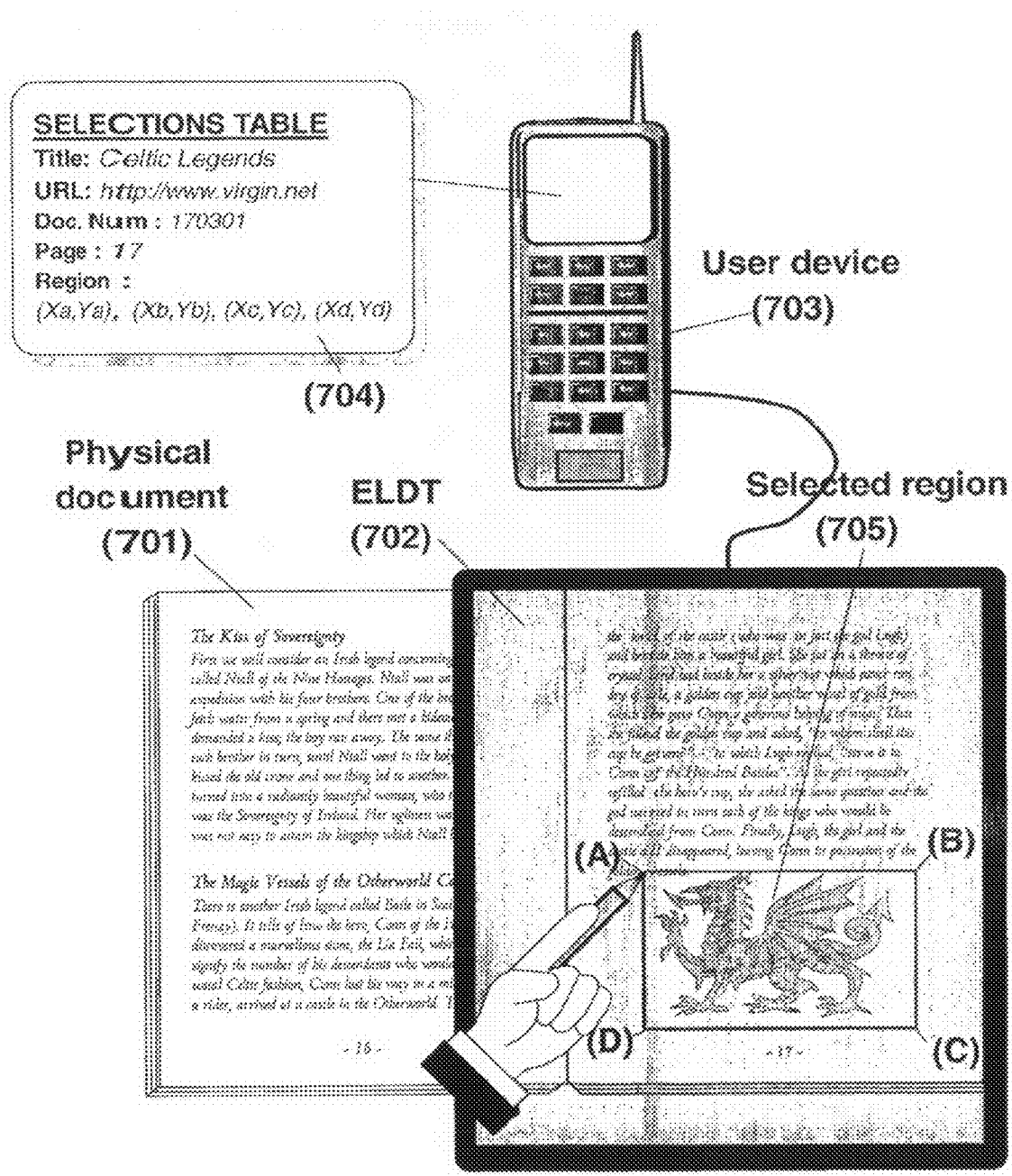
Fig. 7: Different parts of different pages of a same or different documents are selected and recorded in the Selections Table.

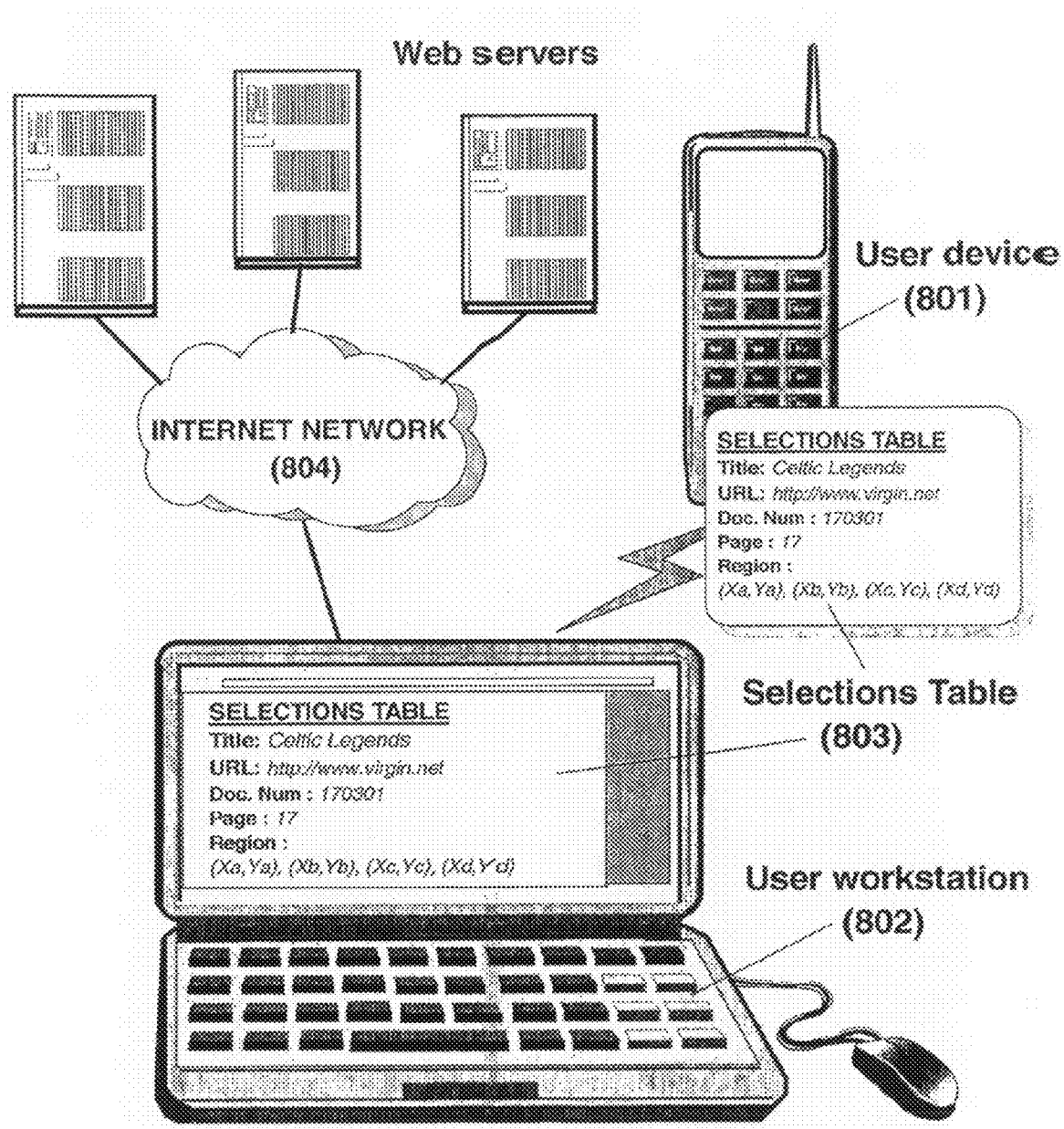
Fig. 8: The Selections Table is transferred from the user device to a user workstation connected to the Internet network

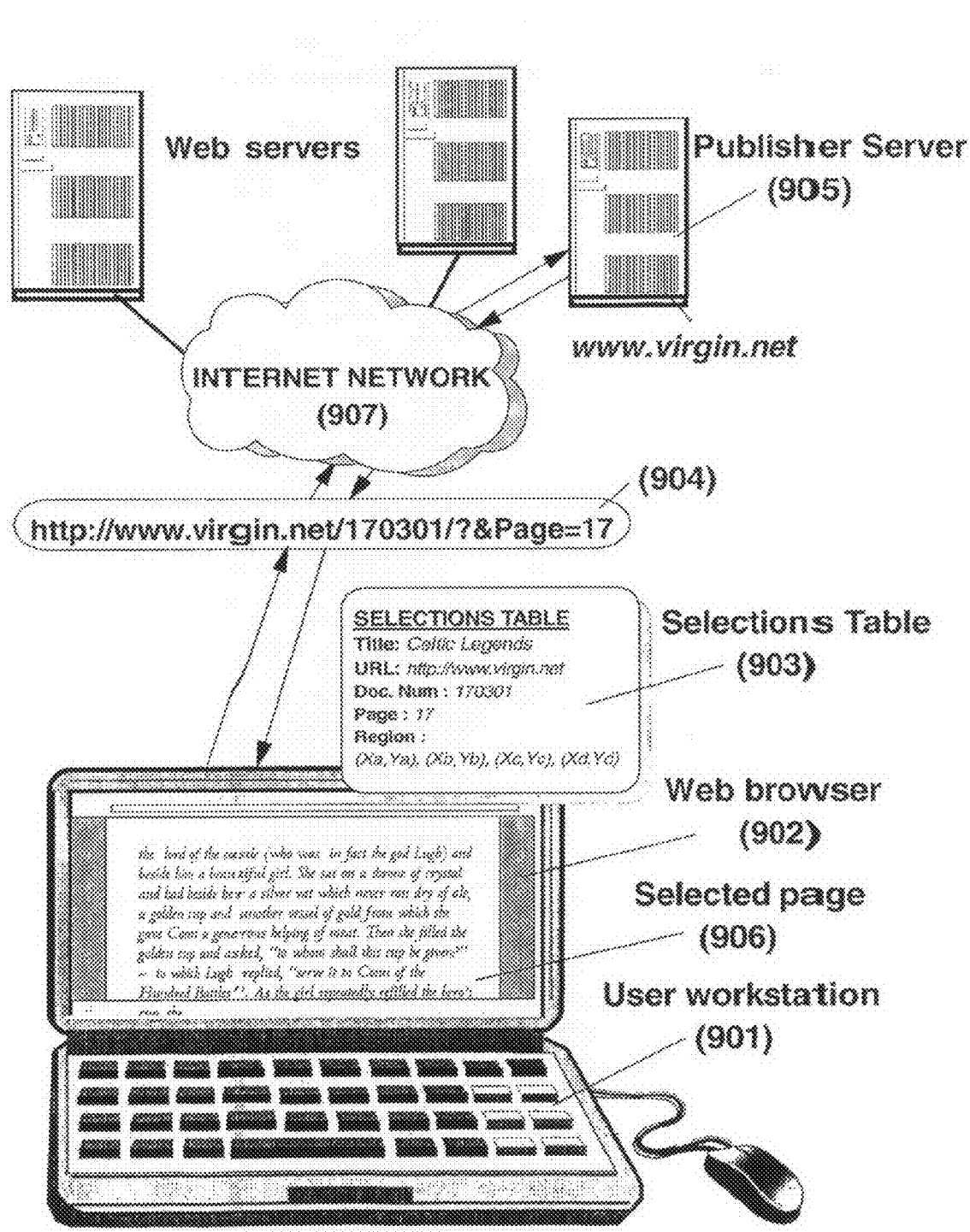
Fig. 9: For a selection referenced in the Selections Table, a request is sent to the Publisher Server to retrieve the corresponding electronic page

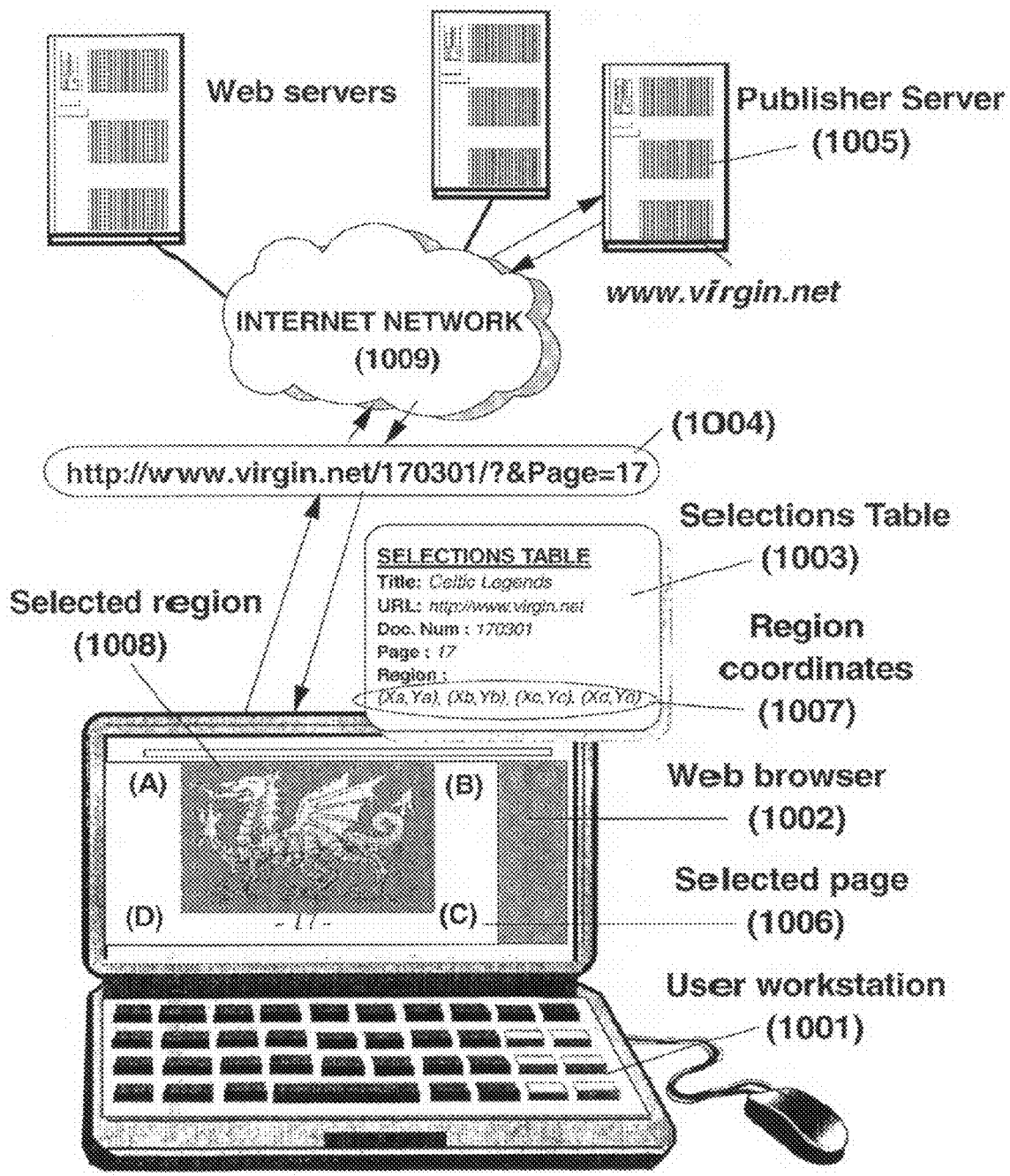
Fig. 10: The selected region is marked on the retrieved electronic page, using the coordinates stored in the Selections Table

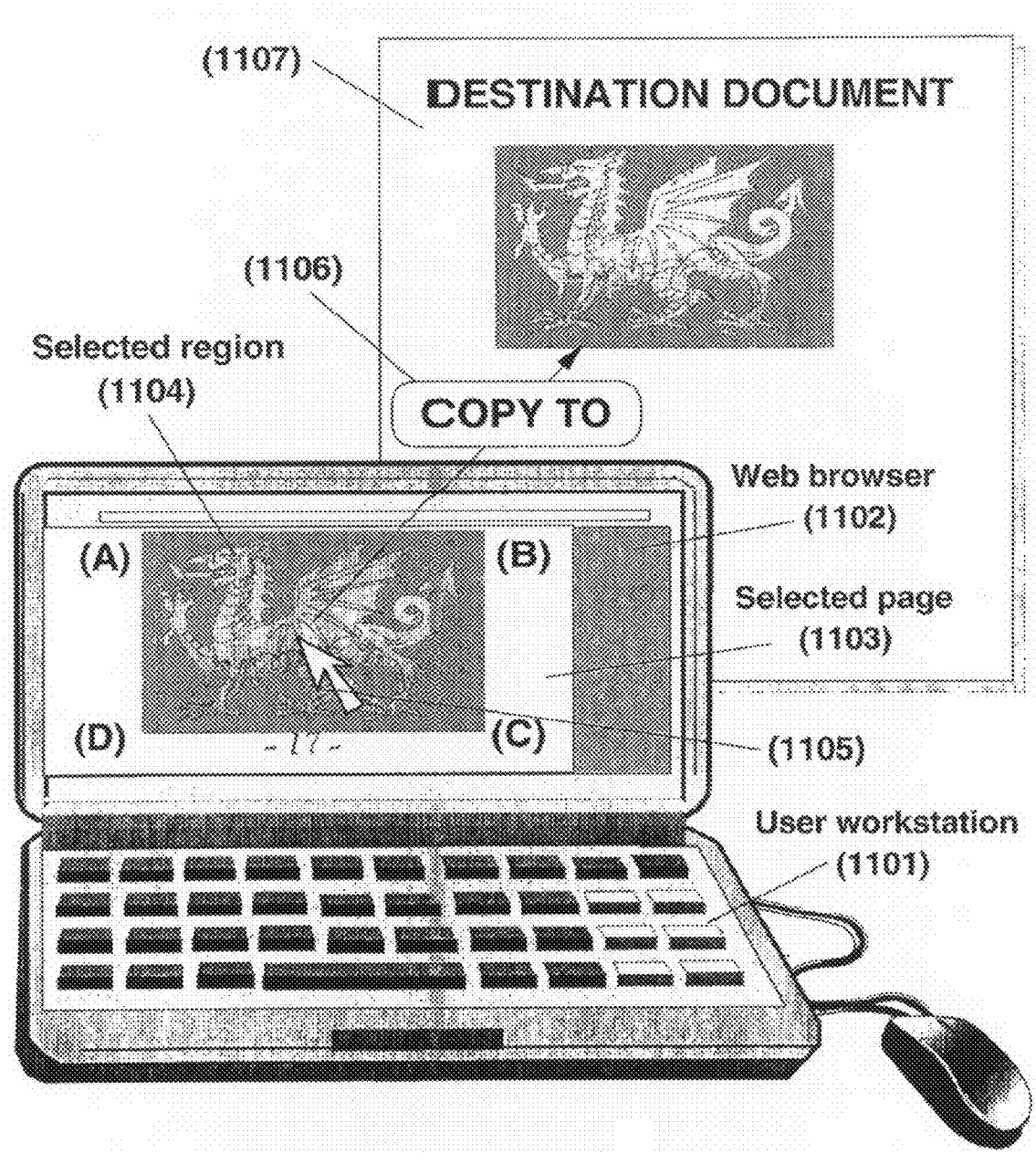
Fig. 11: The user (e.g., by means of the mouse), points to the selected region and copies the information it contains into a new document

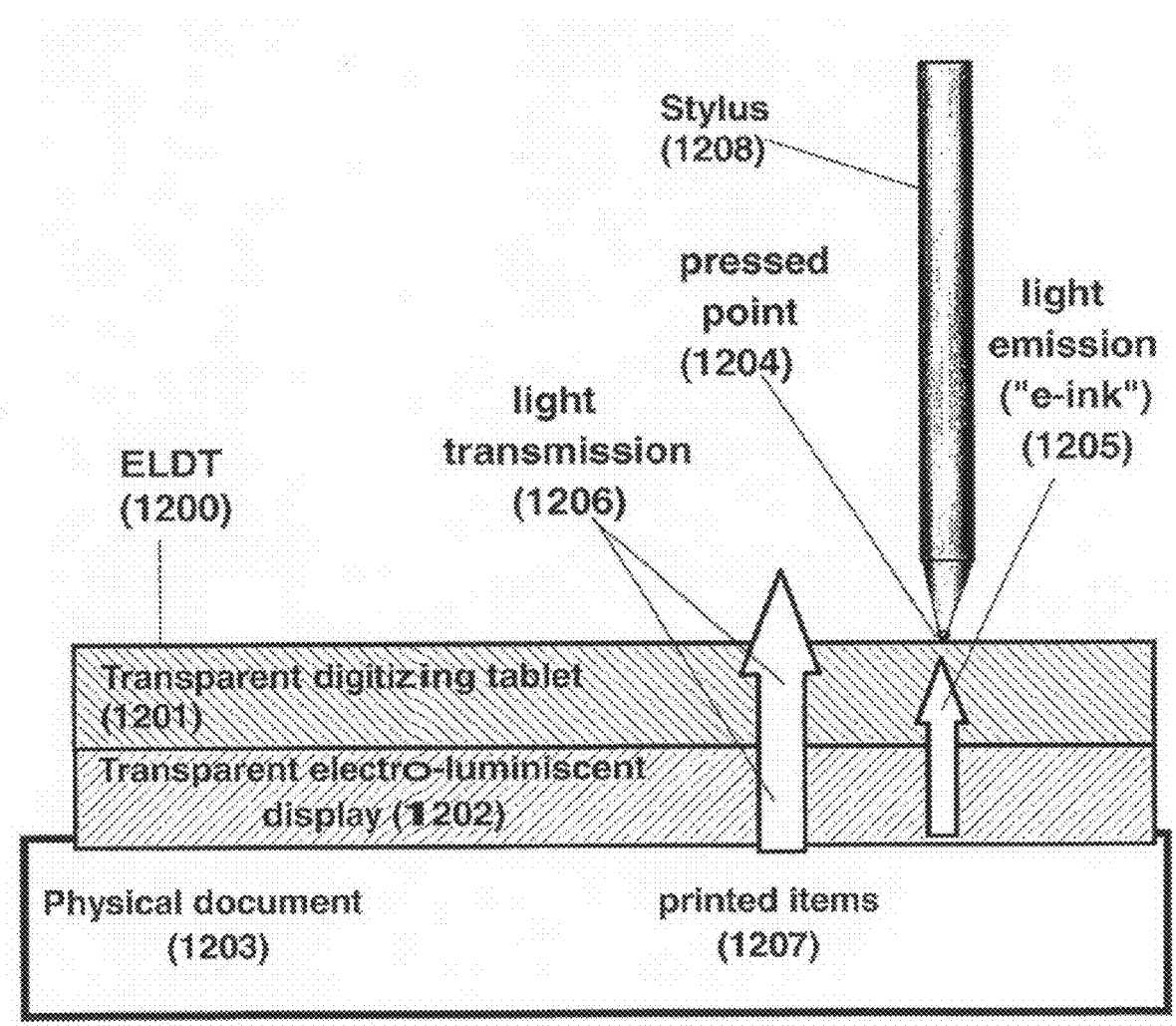
Fig. 12: Transparent electro-luminiscent digitizing tablet (ELDT).

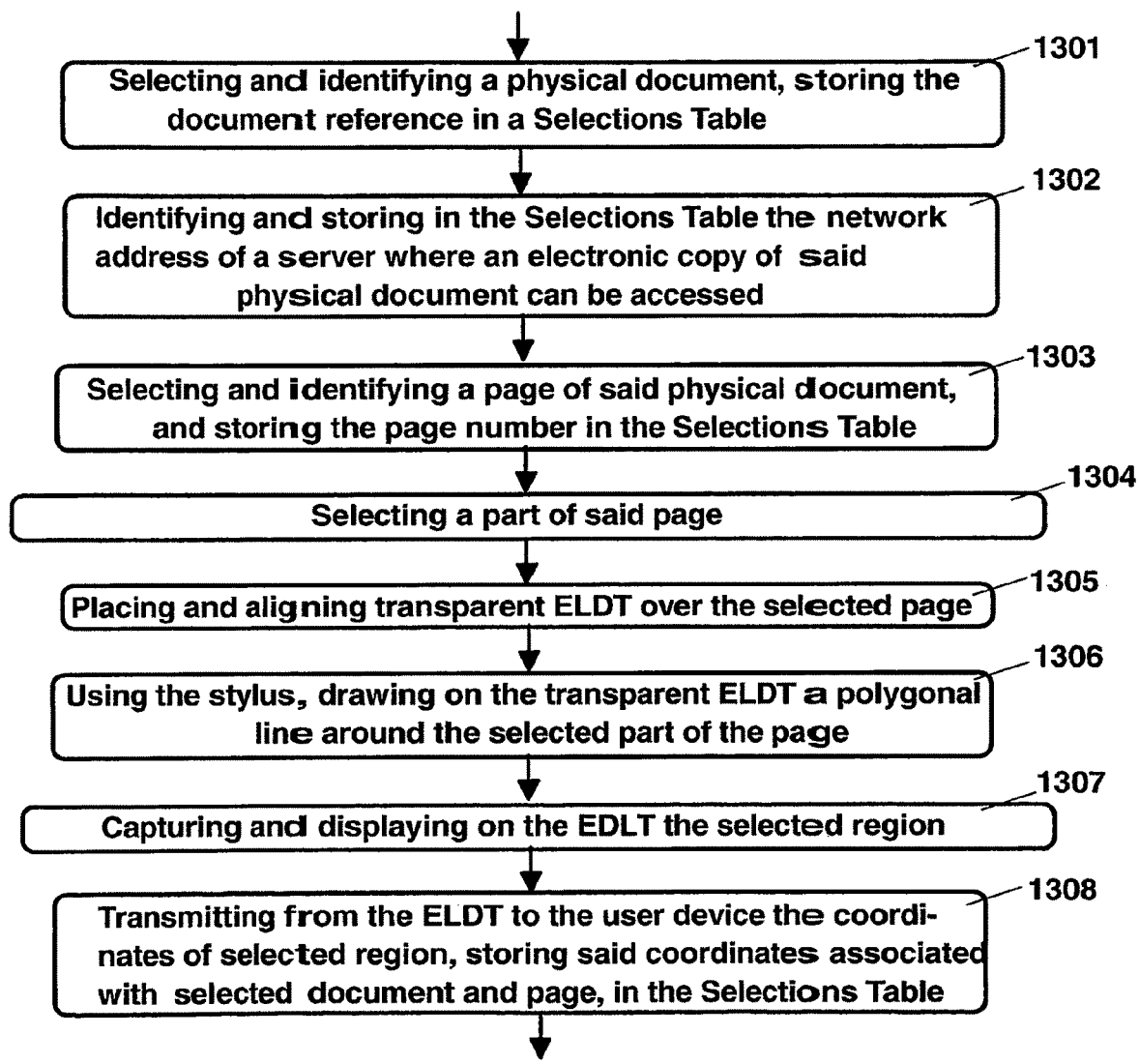
Fig. 13: Method for selecting parts of physical documents and recording said selections in the Selections Table

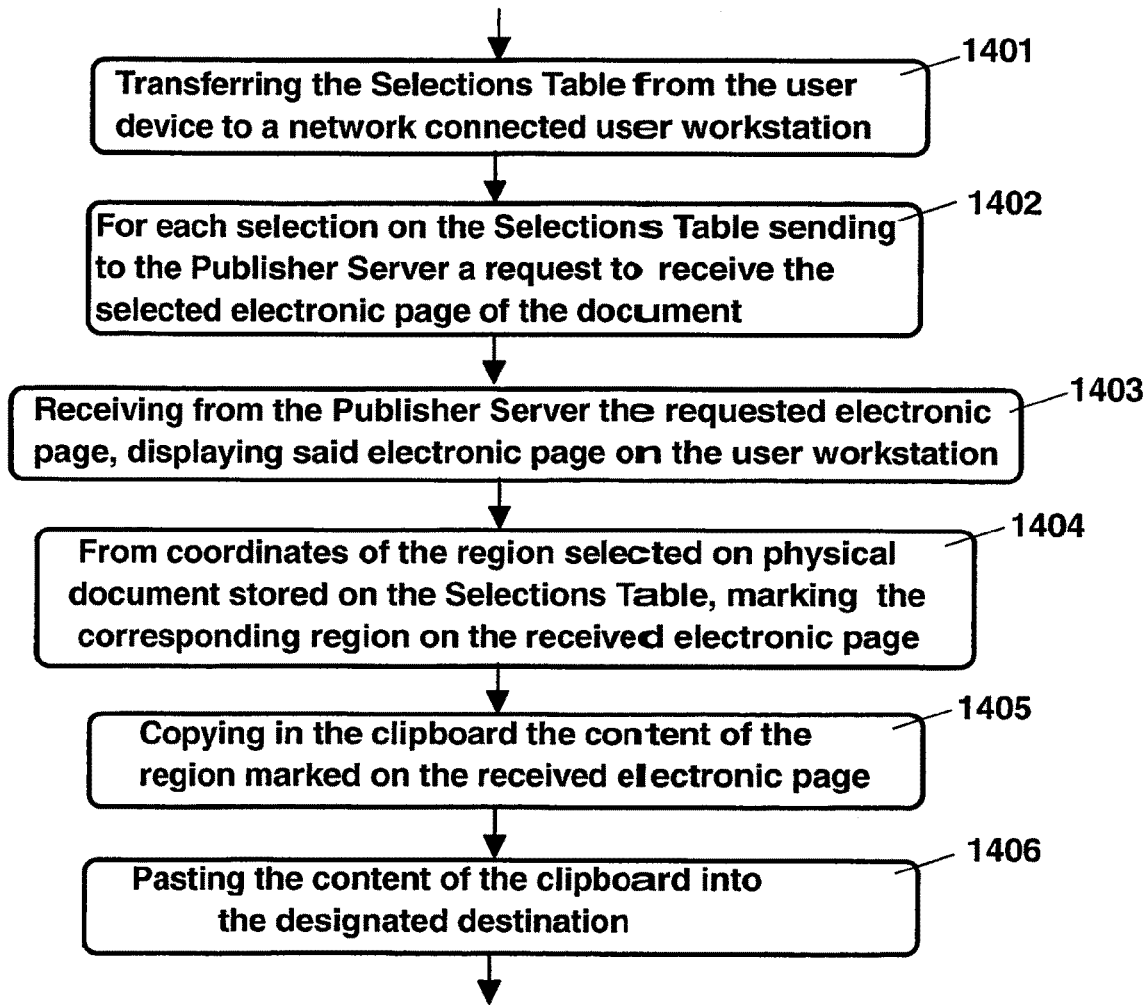
Fig. 14: Method for retrieving electronic copies corresponding to parts of physical documents selected by the user

SYSTEM AND METHOD COMPRISING AN ELECTRONIC DOCUMENT FROM PHYSICAL DOCUMENTS

FIELD OF THE INVENTION

The present invention generally relates to "media adaptive content", "electronic publishing", "print-on-demand", and to document composition and annotation. More particularly, the present invention discloses a system and method for manually designating parts of physical documents (i.e., printed document), and for retrieving through a network, the digital content corresponding to the designated parts.

BACKGROUND OF THE INVENTION

The widespread use of Internet and mobile communications offers new opportunities to combine electronic and printed media and to create "media adaptive" products. The philosophy behind the concept of "media adaptive" product is that information must be transferred to users in a form adapted to their needs. Printed documents and multimedia products are complementary and they must be combined depending on the users needs. To facilitate this evolution, the "electronic content should be accessible directly from the printed medium".

During the last years, due mainly to the widespread use of personal computers and CD-ROMs and to the universal access of millions of users to the World Wide Web, the "electronic publishing" has veritably exploded. An enormous amount of information, including documents, books and all kinds of publications are now accessible to users of personal computers or specialized e-book readers.

Even if the enthusiasm of the public for computer-based reading has been considered by many analysts as a threat to conventional forms of hard-copied publishing, for most people, reading paper cannot be compared with reading an electronic media (e.g., an e-book by using a MS Reader). Paper is portable, available everywhere, can be easily used and manipulated and provides a high resolution. Most people prefer to read paper, whether they are familiar with computers or not.

Notwithstanding the advances made in computer technology in the field of recording and processing data, the use of paper has not decreased. In fact, people are used to browse through paper catalogs, magazines, newspapers, maps and books, to flip through the pages and to glance at pictures and text. For example, a collection of printed color photographs can be much easily and quickly browsed than a sequence of computer screens. Therefore, paper continues to be the means the most widely used to display information. Moreover, because a paper document is more usable than a computer screen for displaying information, it is obvious that a large portion of the paper accumulation results from the print of electronic documents. Most people perform their daily work (such as meetings, projects, presentations, annotations, corrections) on paper and use printed copies instead of original electronic documents.

In the last years, a new publishing technology named "Printing-on-demand", has contributed to keep alive this preference for printed documents. Print-on-demand is in fact a new printing technology, and also a new form of information distribution that makes possible the production of very low print runs. It is a production system where just the required number of copies is printed. Unlike so-called "short-run" printing (traditional book printing in small batches (50-100)) for very limited stockholding, print-on-demand enables the printing of a single book in response to a particular customer order. That means that on-demand titles never goes into stock. The ultimate step in print-on-demand, is the production of one copy at a time. This technology dramatically reduces the storage of hard copies and thus reduces the inventories, the distribution costs and the expenses for recycling or destroying unused copies. Moreover this technology enables on-demand reprinting, which means that titles no longer fall "out of print".

As a conclusion, even if many electronic document systems (e.g., Web browsers, e-books readers) attempt to replace paper by providing new applications such as having access to multimedia information and services, a lot of users still work with paper. Many analysts admit that: "consumers will insist on printing most of their documents" (e.g., e-books, for reading, for browsing, for consulting, for annotating).

Now, when an electronic document is printed, the advantages related to the use of an electronic document disappear. In particular, it is no more possible to edit, select and mark parts of the document, and to copy the selected parts for composing another electronic document. For example, when an electronic document is printed, it becomes impossible for the user to select parts of the printed copy with text or figures and to retrieve the digital information corresponding to the selected parts and to copy this information into another electronic document.

In general terms, there is a real need to provide users with new systems and methods for improving physical copies of electronic documents, (e.g., e-books, Web pages, Lotus Notes, MS Word, Lotus WordPro or Adobe Portable Document Format (PDF)). More particularly, there is a real need to provide users with the capability of exporting selected pieces of information printed on physical documents (e.g., figures, tables, references, paragraphs) into electronic documents. In particular, there is a need to select from a physical document, information such as text and figures and to retrieve this information from the electronic copy of this physical document.

For example, a user seating on a public library, may wish to select portions of different printed publications (e.g., some relevant paragraphs, references, and illustrations printed on "Celtic Legends" related books). He may wish to store data identifying said selections on a stand-alone (i.e., not connected to a network) handheld device (e.g., on a handheld computer, or a personal digital assistant). The same user may also wish to download at a later time, from his stand-alone handheld device to a personal computer or workstation connected to Internet, the data identifying the selections he made on the physical documents and to retrieve through the Web and from the electronic copies of the different printed documents, the electronic information comprised in the selected portions.

Therefore, there is a need for new systems and methods to enable a user to compose an electronic document from information directly selected on physical documents.

None of the methods referenced in the prior art describes a system for directly designating and selecting parts of physical documents, and then automatically retrieving the digital information related to the selected portions.

OBJECTS OF THE INVENTION

It is a broad object of the present invention to improve the current systems and methods for editing, referencing, annotating and composing documents.

It is an object of the present invention to compose an electronic document from information directly selected from a plurality of physical documents.

It is another object of the invention to identify in electronic copies of documents, information previously selected from physical copies of said documents.

It is another object of the present invention to retrieve from electronic copies of documents, the information selected from the physical copies of said documents.

It is a further object of the present invention to use portable, non connected, stand-alone devices, to select parts of documents from physical copies, and to store means for identifying said parts in the electronic copies of said documents.

It is a still a further object of the present invention to retrieve hyperlinked parts of hyperlinked documents (e.g., portions of HTML documents, including hyperlinks) from selections made on physical copies of said hyperlinked documents.

SUMMARY OF THE INVENTION

As defined in independent claims, the present invention relates generally to a method, a system and a computer program for composing an electronic document from the content of one or a plurality of parts of one or a plurality of physical documents selected by a user. The method comprises the step of:

creating, for each selection made by the user, a record in a table, said record comprising means for associating a part selected by the user with its electronic copy, said step, for use in a computer device, comprising the further steps of:
for each selected document:
receiving means identifying the document selected by the user;
receiving means for accessing an electronic copy of said document;
receiving means identifying one or a plurality of pages selected by the user of a physical copy of said document, said physical document comprising one or a plurality of pages;
for each selected page:
receiving means defining on the selected page, one or a plurality of parts selected by the user;
for each selected part:
storing said means defining the selected part in a selections table;
associating in said selections table, said means defining the selected part with:
said means identifying the selected document;
said means identifying the selected page;
said means for accessing the electronic copy of said document.

The method comprises the further step of:
retrieving an electronic copy corresponding to a part of a physical document selected by the user, said step comprising the steps of:
receiving means designating a record in the selections table;
identifying in the designated record:
means identifying a document;
means identifying a page of the document;
means for accessing an electronic copy of the document;
retrieving the electronic copy of the identified page from the electronic copy of the identified document;
identifying, in the designated record, means defining a part of the identified page;

marking said part on the retrieved electronic copy of the identified page;
copying the marked part of the electronic copy of the page into a destination document.

Further embodiments of the invention are provided in the appended dependent claims.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 shows a stand-alone (i.e., not connected to a network) device used to select parts (e.g., textual paragraphs, pictures, tables) of physical documents according to the present invention.

FIG. 2 illustrates how a workstation connected to the network, retrieves the digital information corresponding to the selections previously made by the user on the physical documents according to the present invention.

FIG. 3 shows how a user identifies on a handheld device, a physical document.

FIG. 4 shows how a user identifies on a handheld user device, a page of a physical document.

FIG. 5 shows how a user aligns a transparent ELDT over a selected page of a document.

FIG. 6 shows how a user marks a part of a physical document on the ELDT device by means of a stylus.

FIG. 7 illustrates how a plurality of parts of different pages in a same or different physical documents are selected and recorded in a Selections Table located on the user device according to the present invention.

FIG. 8 shows how data stored in the Selections Table, is transferred from the handheld device to a workstation connected to the Internet network.

FIG. 9 illustrates how, for each selection recorded in the Selections Table, a request is sent to a Publisher Server to retrieve the electronic page containing the information corresponding to the selection made in the physical document.

FIG. 10 illustrates how, using coordinates stored in the Selections Table, the corresponding region is marked on the electronic page, and how the digital content of this region is copied into the clipboard buffer of the user system according to the present invention.

FIG. 11 illustrates how the user, pointing to the region marked on the received electronic page, copies or pastes the digital information corresponding to the selection made in the physical document.

FIG. 12 shows the internal structure and the principle of operation of an Electro-Luminescent Digitizing Tablet (ELDT).

FIG. 13 shows the steps of selecting a part of a physical document and of recording said selection in a Selections table according to the present invention.

FIG. 14 shows the steps of retrieving the electronic copy of a part of a physical document selected by a user according to the present invention.

DETAILED DESCRIPTION OF THE PREFERRED EMBODIMENT

The invention itself, as well as a preferred mode of use, objects and advantages thereof, can be understood by reference to the following illustrative embodiment described by the accompanying drawings.

The present invention addresses the need of retrieving digital copies of information contained in physical documents. The digital information may be an electronic representation of text and images printed on physical documents. This electronic representation may include text, graphical elements (such as charts, graphs or illustrations), hypertext . . . .

The invention improves the current systems and methods for editing, referencing, annotating and composing electronic documents, by allowing users to compose an electronic document from information directly selected from one or a plurality of physical documents.

Referring to FIGS. 1, 2, 6, 7 and 8, the present invention can be illustrated with the following practical example: a user seating in a public library, selects parts of different printed publications (101) (e.g., some relevant paragraphs (605), references, and illustrations (705) printed on "Celtic Legends" related books), and stores these selections (105) on an stand-alone device (104) (e.g., on a cellular phone). Then, this same user downloads, from his stand-alone device (801) to a workstation (802) (e.g., a personal computer) connected to the Internet network (804), the selections (803) previously made on the printed publications (101). Finally, he retrieves through the Web from one or a plurality of servers (206), the electronic information corresponding to parts (204) selected in the different printed publications and copies this electronic information into an electronic document.

Apart of retrieving the digital information comprised in parts of physical documents, an advantage of the present invention is the possibility to retrieve parts of HTML (Hyper-Text Markup Language) documents comprising hyperlinks.

According to a first aspect of the invention, a system and method is disclosed for selecting parts (605) of physical documents (601) and for creating, for each selection made by the user, a record in a Selections Table (604). Said record comprises means for associating the part (605) selected by the user with its electronic copy. The method, for use in a computer device, of selecting a new part of a physical document and creating a new record in the Selections table corresponding to this new selection, comprises the steps of:

identifying a physical document selected by a user, said physical document comprising one or a plurality of pages.
identifying an electronic copy of said physical document, preferably by identifying:
a publisher server network address (i.e., the URL of the Publisher-Server), and
a document number.
In a preferred embodiment, the network address of the publisher server and the document number are printed on said physical document and are entered by the user in the computer device.
identifying a page selected by the user.
In a preferred embodiment, the page number is entered by the user in the computer device.
identifying a part selected by the user on a page of said physical document. Said step comprises the steps of:
placing aligned a transparent electro-luminescent digitizing tablet (ELDT) over (or under) the selected page;
identifying the selected part of the document.
In a preferred embodiment, the user draws over the ELDT, a polygonal line around the selected part by means of a stylus which senses and transmits the coordinates of the polygon vertices to the computer device.
recording in a Selections Table, preferably located on the computer device, means for identifying the electronic copy of the physical document and for retrieving the digital information corresponding to the part of the physical document selected by the user, said means comprising:
the publisher server network address,
the document number;
the number of the page selected by the user; and
the vertices coordinates of the polygon drawn by the user to mark the part of the page selected by the user in the physical document.

According to a second aspect of the invention, a system and method is disclosed for retrieving the electronic copy (1008) corresponding to a part (705) of a physical document (701) selected by a user. For each record in the Selections Table (1003), the method of retrieving the electronic copy of a selection made by the user from the corresponding electronic document stored on the Publisher Server (1005), comprises the steps of:

retrieving the electronic page from the electronic document located on the Publisher Server using:
the Publisher Server network address (URL),
the document number, and
the number of the page selected by the user
previously recorded in the Selections Table.
identifying in the received electronic page, the electronic information corresponding to the selected part of the physical document, using the vertices coordinates of the polygon drawn by the user around said selected part, said coordinates being recorded in the Selections Table.
copying the identified electronic information into a buffer, preferably the operating system clipboard.
pasting the buffer content into a destination determined by the user.

Components of the System According to the Present Invention

As shown in FIGS. 1 and 2, the system according to a particular embodiment of the present invention, comprises the following components:

one or a plurality of physical, i.e., hard-copy, printed documents (101) (e.g., books) comprising one or a plurality of pages.
a physical document interface comprising a transparent Electro-Luminescent Digitizing Tablet (ELDT) (102) (to be placed over a page of a selected physical document) for capturing and digitizing strokes made by the user to mark parts of physical documents.
a stylus (103) to make strokes on the ELDT (102) to mark parts of the physical documents.
a user device (104), connected (106) to the ELDT interface (102) for storing annotations and strokes made on the ELDT by the user with the stylus.
a user workstation (201).
a Publisher Server (206) (e.g., a Web server).
a communication network (207) (e.g., the Internet network).

The main components of the disclosed system and their operation are described hereafter.

Physical Documents

Physical documents (101) can be of any kind, for example, newspapers, legal documents, maps (e.g., topographical maps, political maps, historical maps, route maps, shaded relief maps, city maps, natural resources maps, rail road maps or even any other type of map), fiction novels, academic text books, technical books, commercial catalogs or even any other type of engraved, written, or printed surface. The material of the document can be paper, plastic, wood or any other material. The electronic version of the physical document (301) is stored on a Publisher Server (206). To identify from a physical document (301), its corresponding electronic version:

- the URL (i.e., the Internet address) (306) of the Publisher Server (206) where this electronic version, is located; and
- a reference to the document (307) (e.g., the ISBN number, or any other name, number, reference)

are printed on or attached to the physical document (e.g., on the front cover, back cover or first page).

Transparent Electro-Luminescent Digitizing Tablet (ELDT)

As shown in FIG. 12, in a preferred embodiment the Electro-Luminescent Digitizing Tablet (ELDT) (1200) comprises two superposed, functionally independent, transparent foils, namely:

- a transparent Digitizing Tablet (DT) (1201), of the type commonly used to manufacture Position Sensible Liquid Crystal Display Devices (PSLCDs) for computers. The generated signals are generally proportional to the coordinates of the point pressed (1204) by the stylus (1208), and
- a transparent electro-luminescent display (EL) (1202), which is a transparent, bright, self-emitting display that can emit light (1205) from either one or both surfaces.

The combination of both foils (i.e., the digitizing tablet (1201) stacked over the electro-luminescent display (1202)) forms an, electro-luminescent digitizing tablet (ELDT) (1200). FIG. 12 represents an ELDT placed and aligned over a physical document (1203) comprising a plurality of items (1207) (i.e., words, pictures, icons, etc.) printed (or written, painted, engraved . . . ) on its surface. This figure illustrates how the electro-luminescent display (1202) emits light (1205) at the points (1204) pressed by the stylus (1208). The points pressed by the stylus are highlighted over the physical document (1203), while the remainder parts of the ELDT, not being marked (or pressed) by the stylus, transmit light (1206) through both transparent foils (1201), (1202), so that the surface of the physical document is visible on non marked (or pressed) regions.

The ELDT may communicate (106) with the user device (104) over an infrared link, a serial wired connection or any other communication means (e.g. by means of a wireless connection operating in the globally available 2.4 Ghz band of the "Bluetooth" specification, as promoted by the "Bluetooth Special Interest Group" and documented on the Official Bluetooth Website http://www.bluetooth.com/).

Transparent Digitizing Tablets

Digitizing tablets are the electronic equivalents of the familiar pencil and paper used for drawing, tracing, or sketching. The movement of a pencil-like stylus over a tablet surface re-creates a drawing on the computer screen. Drawings may then be imported to graphics or presentation application programs and be edited, formatted, and printed.

According to an aspect of the present invention, the transparent digitizing tablet (1201) may be commonly built on a substrate having a matrix formed by

- a plurality of first lines formed over a plurality of scanning lines, and
- a plurality of second lines formed over a plurality of data lines.

The first and second lines are used to determine the position of an applied stylus. The transparent lines and contacts are made by a transparent conductive material, e.g., indium tin oxide (ITO). When integrated on top of a display surface, a transparent digitizing tablet is actually a layer that has a mesh of transparent wire sensors running through it and that sometimes visually looks like moiree patterns on the top of the display. These thin wires in conjunction with the pen produce movement and button events that are reported to the computer.

Transparent digitizing tablets are produced, for example, by Calcomp and Wacom. A transparent digitizing tablet technology it is possible to use for implementing the present invention, is the one used by the Wacom Technology Company. The manufacturing of pen tablet systems is described on the Web site of Wacom Technology Co. at http://www-.wacom.com/lcdtablets/.

Transparent Electro-Luminescent Displays

According to another aspect of the present invention, the transparent electro-luminescent display (1202) may include a substrate having an array formed by

- a plurality of transparent scanning lines,
- transparent data lines crossing said scanning lines, and
- electro-luminescent (EL) elements (pixels) on the intersections of the scanning and data lines.

With today's technology, this passive-matrix, light-emitting display may be made of an array of TOLED's (Transparent Organic Light Emitting Devices) of the types used to create vision area displays on windshields, cockpits, helmets and eyeglasses.

In its most basic form, a TOLED is a monolithic, solid-state device consisting of a series of "small molecule" organic thin films sandwiched between two transparent, conductive layers. When a voltage is applied across the device, it emits light. This light emission is based upon a luminescence phenomenon wherein electrons and holes are injected and migrate from the contacts toward the organic heterojunction under the applied electric field. When these carriers meet, they form excitons (electron-hole pairs) that recombine radiatively to emit light. As a result, TOLEDs are bright, self-emitting displays that can be directed to emit from either or both surfaces. This is possible because, in addition to having transparent contacts, the organic materials are also transparent over their own emission spectrum and throughout most of the visible spectrum.

TOLED displays are today manufactured with standard silicon semiconductors. Since TOLEDs are thin-film, solid-state devices, they are very thin, lightweight and durable, ideal for portable applications, like the one disclosed in the present invention. TOLEDs can be bottom, top, or both bottom and top emitting. Also, TOLEDs technology has attractive advantages regarding, transparency (TOLED displays can be nearly as clear as the glass or substrate they're on and when built between glass plates, TOLEDs are >85% transparent when turned off), energy efficiency (for longer battery life), full viewing angle, bright and high contrast light emission, fast response time, and environmental robustness. Thus, TOLEDs are well suited for manufacturing the light-emitting, electro-luminescent, display component, used jointly with the transparent digitizing tablet accordingly with the present of this invention.

One example of light emitting foil technology it would be possible to use is the technology used for the TOLEDs manufactured by UNIVERSAL DISPLAY CORPORATION, fully described in the Web site of UNIVERSAL DISPLAY CORPORATION at http://www.universaldisplay.com/toled.php Stylus Pen like stylus (1208) are commonly used as input devices for data processing and storage systems in place of conventional keyboards and mouse devices. The stylus (1208) is used in combination with the digitizing tablet (1201) part of the ELDT (1200). The digitizing tablet (1201) incorporates a resistive or capacitive digitizer or sheet material. As such, information can be input by writing with the stylus on the ELDT device. The electro-luminescent (1202) component of the ELDT displays the instantaneous position, and path of movement, of the stylus. In this way, the ELDT device displays the pattern traced thereon (e.g. a written message, sketch or signature).

One example of stylus it is possible to use, in combination with a transparent digitizing tablet, is the wireless, pressure sensitive Wacom's Pen.

European patent application 01480135.1, filed 21 Dec. 2001/ U.S. application Ser. No. 10/317,504, filed Dec. 12, 2002 entitled "Device, method and system for retrieving and displaying handwritten annotations" (IBM's reference FR9 2001 0048) discloses an apparatus for use with a computer system, for capturing and displaying handwritten annotations, comprising a transparent digitizing tablet adapted to cooperate with a stylus. It also comprises a transparent electro-luminescent display adapted to display captured handwritten annotations, the transparent digitizing tablet being superposed on the transparent electro-luminescent display. Thanks to the transparent electro-luminescent display and the transparent digitizing tablet superposed thereon, handwritten annotations can be marked and displayed on a physical document without physically marking the document. Thus, a user can make annotations over a physical document using "electronic ink" so that what is being "written" by the user on the physical document (on the digitizing tablet) can appear to the user electronically illuminated by the transparent electro-luminescent display, on the same physical document. Such an apparatus enables the user to draw, sketch, annotate, construct, outline, enhance erase, associate and display information directly over physical documents while keeping intact the integrity of said physical documents.

User Device

The user device (104) can be a personal computer, an Internet enabled cell phone, a PDA, a network computer, an Internet appliance or a wireless IP enabled device. The user device can be used alone or can be connected to a network (e.g. to the Internet network). However, the user device must include means (106) for connecting the ELDT device (102) and for receiving and storing the selections made by the user on the physical documents (101).

It is important to note that the user device (104) can be a simple stand-alone handheld device, (such as a PDA, or a cell phone) with a small memory, a small display (even lacking a graphics display), just for handling:

the URLs (306) of the Publisher Servers (206), the document numbers (307), the selected page numbers (406), and the coordinates of the points (A, B, C, D) defining the polygon (605), (705) drawn by the user around the selected parts (by means of the interface provided by the combination of the ELDT (102) and stylus (103)).

In such embodiment, the user device (104) must include means for transferring the recorded selections data to a user workstation (201) connected to a network (e.g. to the Internet network).

User Workstation

The user workstation (802) can be a personal computer connected to a network (804) (e.g. to the Internet network). The user workstation includes means for receiving information stored on the user device (801).

Publisher Server

The Publisher Server (206) is primarily the repository where electronic copies of physical documents (101) are stored. The electronic copy of a physical document includes an exact replica of the original document. The electronic representation may also include text, graphical elements (such as charts, graphs or illustrations), hypertext (i.e., hyper-linked objects) . . . .

Each physical copy of a document (or publication) is associated with an electronic copy of this document by means of:
- the network address (i.e., the URL or Internet address) (306) of the Publisher Server (206), and
- a reference to the document (307) (e.g., the ISBN number, or any other), printed or attached to physical document (301) (e.g., on the front cover, back cover or first page).

Method of Selecting Parts of Physical Documents and of Recording Said Selections in a Selections Table As shown in FIG. 13, the present invention discloses a system, method and computer program for manually selecting and associating parts of physical documents with electronic copies of said printed parts.

The method, for use in a computer system, comprises the steps of:

(1301) identifying a physical document selected by a user. In a preferred embodiment, a document identifier is printed on the physical document and entered in the computer system by the user.

storing the document identifier in a Selections Table.

(1302) identifying a network address where an electronic copy of said physical document can be accessed. In a preferred embodiment this network address is printed on the physical document and entered in the computer system by the user.

(1302) storing in the Selections Table, said network address;

(1303) identifying a page selected by the user in said physical document, and storing means for identifying said page in the Selections Table.

(1304) identifying the part of said page selected by the user:

(1305) the transparent ELDT is placed aligned over the selected page by the user so that the user can see the page through the transparent ELDT device.

(1306) The user, using the stylus, draws over the transparent ELDT, a polygonal line around the selected part.

(1307) the coordinates of the selected part (or region) are captured (i.e., digitized) and displayed by means of the ELDT.

(1308) receiving from the ELDT the coordinates of the selected part (or region), and storing the coordinates associated with the selected page and document, in the Selections Table.

FIG. 1 shows the main components of the invention for creating means for referencing electronic information related to selected parts of physical documents (101). In a preferred embodiment, the main components are not connected to the Internet network and basically comprise:
- a transparent Electro-Luminescent Digitizing Tablet (ELDT) (102),
- a stylus (103), and
- a handheld user device (104) (e.g., a PDA, a hand-held computer, a cell phone).

FIG. 3 shows how the user selects a physical document (or publication) (301) (e.g., printed book entitled "Celtic Legends". By means of any user interface (keyboard, mouse, voice recognition software and microphone, . . . ) or any other reading means (e.g., barcode reader . . . ), the user enters a code or name for identifying the document. In the preferred embodiment shown in FIG. 3, the user opens a new record in a table called "Selections Table" (305) located on the user device (304) and types:
- the publication title (e.g., "Celtic Legends") (308),
- the address on the Web (e.g., the URL "http.//www.virgin.net") (306) of the Publisher Server where the electronic copy of the physical document (301) is stored, and
- the reference number (or ISBN) (e.g., "170301") (307) of the electronic document stored in the Publisher Server. This electronic document is a copy (with the same format) of the selected physical document (301).

The URL (306) of the Publisher Server and the document reference number (307), used to identify the document and locate the electronic document copy through the Web, must be printed or attached at a predefined reserved place on the physical document (301) (e.g., on the front cover, back cover or first page). For each new selection made by the user in a given physical document (301), a new entry must be created in the Selections Table (305).

FIG. 4 shows how the user while browsing or reading a physical document (401), finds on a page, an interesting paragraph (406) and transcribes the content of this paragraph to another document or application. To create a reference to this interesting paragraph, the user first identifies the selected page by entering the Page Number (e.g., page "16") (406) on the user device (404). The Page Number (406) is then recorded in the Selections Table (405).

As shown in FIG. 5, after entering on the user device (504), the number of the selected page, the ELDT (502) is then:
- placed by the user over the selected page, and
- aligned (506) with the borders of this page by some conventional means (e.g., by adjusting the upper left corner of the ELDT device with the upper left corner of the page).

After this operation, the user can see the content of the selected page through the transparent ELDT.

FIG. 6 shows how to identify the part (406) of the physical document (601) selected by the user. Keeping the transparent ELDT device (602) aligned over the selected page, the user marks on this page, by means of the stylus, the selected part (605) (e.g., the user marks the points "A", "B", "C", "D", of the polygonal region drawn around the selected region). The coordinates of the points (e.g., "A", "B", "C", "D") defining the polygonal region are sensed by the ELDT device (602) and are transmitted to the user device (603). The coordinates are recorded in the Selections Table (604), and are associated with the selected document and page identification means.

FIG. 7 shows how, using the same procedure, different parts of different pages of a same or different physical documents can be selected by the user. For each selection made by the user on a physical document (701),
- the publication title (e.g., "Celtic Legends") (308),
- the network address (URL) of the Publisher Server (e.g., "http.//www.virgin.net") (306),
- the document number (e.g., "170301") (307),
- the page number (e.g., page "17"), and
- the coordinates of the vertices defining the polygonal region around the selected part of physical document (e.g., "A", "B", "C", "D"), are recorded on a new record on the Selections Table (704).

Method of Retrieving Electronic Copies Corresponding to Parts of Electronic Documents Selected by the User As shown in FIG. 14, the present invention discloses also a system, method and computer program for retrieving through a network (e.g., through Internet) the digital content of parts of physical documents selected by a user.

The method comprises the steps of:
- (1401) transmitting the Selections Table from the user device to a network connected user workstation;

for retrieving the electronic copy of a selection recorded in the Selections Table:
- (1402) sending a request to the Publisher Server to receive from the electronic document, the selected electronic page containing the digital content of the selection;
- (1403) receiving from the Publisher Server the requested electronic page,
- (1403) displaying said electronic page on the user workstation;
- (1404) marking the selected region on the received electronic page; the coordinates of the region selected on the physical document being stored in the Selections Table;
- (1405) copying into the operating system clipboard, the content of the region marked on the electronic page;
- (1406) copying (or cutting) and pasting the clipboard content in the user designated destination.

FIG. 2 shows how, according to a preferred embodiment of the invention, a workstation (201) connected to a network (e.g., to the Internet (207)) is used for retrieving from the electronic documents stored on the Publisher Servers (206), the digital information (204) corresponding to the selections (705) previously made by the user on the physical documents (by means of components (102), (103), (104)).

FIG. 8 illustrates how, according to a preferred embodiment of present invention, once selections in physical documents (e.g., text paragraphs, pictures, tables) have been performed by means of the stand-alone components (102) (103) (104), data recorded in the Selections Table (803) located on the user device (801), is transmitted to a workstation (802) connected to the internet network (804).

FIG. 9 illustrates how the user selects a record in the Selections Table (903) stored on the user workstation (901), and retrieve from the Publisher Server (905), the digital content of the selection. As illustrated by this figure, using the information stored in the Selections Table (903):
- the URL of the Publisher Server (e.g., "http.//www.virgin.net") (306),
- the document number (e.g., "170301") (307), and
- the selected page number (e.g., page "17"), The user workstation sends a request (e.g., "http://www.virgin.net/170301/?&Page=17") (904) through the Internet network (907) to the Publisher Server (905), to retrieve the selected electronic page (i.e., page "17") from the selected electronic document (i.e., "170301"). The electronic document is the exact replica on the Publisher Server (905) of physical document (entitled "Celtic Legends"). As illustrated in this same figure, the requested electronic page (906) is retrieved from the electronic document stored on the Publisher Server (905) and transmitted to the user workstation (901) to be displayed.

FIG. 10 shows how when an electronic page (1006) of a document is retrieved from the Publisher Server (1005) and displayed on the user workstation (1001), a plug-in program resident on this user workstation (1001) marks the selected region (1008) on the received electronic page (1006), and then copies the digital content of this region into the clipboard of the operating system. It must be noted that plug-in programs for controlling mouse coordinates and actions (such as marking one or a plurality of rectangular regions on the screen using screen coordinates) can be implemented using, for instance, assembler code, or open -free- code from "C" utilities. The plug-in program marks the selected region using the coordinates (1007) of the points (e.g., "A", "B", "C", "D") defining the polygon enclosing the region (705) selected by the user by means of the ELDT device (702) on the selected page of the physical document (701), FIG. 11 illustrates how, alternatively, the user points (e.g., by means of the mouse) (1105) to the region marked (1104) on the received electronic page (1103) (this region corresponds to the region marked by the user (705) on the corresponding physical document (701)), and then "copies" it (1106) (or "cuts") and "pastes" it in an electronic document (1107) or any other data repository or application on the user workstation.

It must be noted that the standard COPY (or even CUT) commands of most operating systems saves the selection in the clipboard. Also, the standard PASTE command transfers the contents of the clipboard to the current page of a document, either at the current insertion point or in place of the selection. If the clipboard comprises URLs (hyperlinks), these URLs are also included in the pasted data.

What has been described is merely illustrative of the application of the principles of the present invention. Other arrangements and methods can be implemented by those skilled in the art without departing from the spirit and scope of the present invention.

What is claimed is:

1. A method for processing a physical document, said method comprising:

creating a record in a selections table stored in a user device, said creating the record comprising entering into the record: a document number that identifies both the physical document and an electronic document that is an electronic copy of the physical document, a page number that identifies a page of the physical document and a corresponding page of the electronic document, and a network address of a server that stores the electronic document;

receiving, by the user device, an identification of where a selected region within the page of the physical document is located within the page, wherein the identification identifies the coordinates of the vertices of a polygon drawn around the selected region, and wherein said receiving the identification comprises receiving the identification by the user device from a transparent Electro-Luminescent Digitizing Tablet (ELDT) while the transparent ELDT is aligned over the page of the physical document and has sensed the identification from the polygon drawn over the transparent ELDT and around the selected region;

inserting the received identification into the record of the selections table, and sending, by the user device to a user workstation, selected data from the record of the selections table stored in the user device, wherein the selected data comprises the document number that identifies both the physical document and the electronic document that is an electronic copy of the physical document, the page number that identifies the page of the physical document and the corresponding page of the electronic document, and the network address of the server that stores the electronic document.

2. The method of claim 1, wherein the electronic document is an exact replica of the physical document.

3. The method of claim 1, wherein the user device is a stand-alone handheld computer device.

4. The method of claim 1, wherein the method further comprises:

said user workstation receiving the selected data sent by the user device;

sending, from the user workstation across a network to the server at the network address, a request for the page of the electronic document, wherein the request specifies the document number and the page number; and receiving, by the user workstation from the server, the requested page of the electronic document.

5. The method of claim 4, wherein the network is an Internet Protocol (IP) network, wherein the network address is an Uniform Resource locator (URL), wherein the server is a Web server, and wherein the electronic copy is a HyperText Markup Language (HTML) document.

6. The method of claim 1, wherein the request does not include any text or graphics comprised by the physical document other than the document number and the page number.

7. The method of claim 1, wherein the method further comprises transmitting, to a destination document, a copy of a region on the received page of the electronic document corresponding to the selected region on the physical document.

8. The method of claim 7, wherein said transmitting to the destination document comprises:

marking, by a plug-in program resident on the user workstation, the selected region on the received page of the electronic document; and copying the marked region into a destination document.

9. The method of claim 8, wherein said copying the marked region into the destination document comprises:

copying the marked region to a clipboard of an operating system in the user workstation; and pasting the marked region on the clipboard into the destination document.

10. A computer program product comprising a computer readable storage medium, said storage medium storing instructions for performing a method for processing a physical document when said instructions are executed on a user device, said method comprising:

creating a record in a selections table stored in the user device, said creating the record comprising entering into the record: a document number that identifies both the physical document and an electronic document that is an electronic copy of the physical document, a page number that identifies a page of the physical document and a corresponding page of the electronic document, and a network address of a server that stores the electronic document;

receiving, by the user device, an identification of where a selected region within the page of the physical document is located within the page, wherein the identification identifies the coordinates of the vertices of a polygon drawn around the selected region, and wherein said receiving the identification comprises receiving the identification by the user device from a transparent Electro-Luminescent Digitizing Tablet (ELDT) while the transparent ELDT is aligned over the page of the physical document and has sensed the identification from the polygon drawn over the transparent ELDT and around the selected region;

inserting the received identification into the record of the selections table, and sending, by the user device to a user workstation, selected data from the record of the selections table stored in the user device, wherein the selected data comprises the document number that identifies both the physical document and the electronic document that is an electronic copy of the physical document, the page number that identifies the page of the physical document and the corresponding page of the electronic document, and the network address of the server that stores the electronic document.

11. The computer program product of claim 10, wherein the user device is a stand-alone handheld computer device.

* * * * *